(12) United States Patent
Barakat et al.

(10) Patent No.: US 9,304,740 B2
(45) Date of Patent: Apr. 5, 2016

(54) CHAOS-BASED PSEUDO-RANDOM NUMBER GENERATION

(71) Applicant: King Abdullah University of Science and Technology (KAUST), Thuwal (SA)

(72) Inventors: Mohamed L. Barakat, Thuwal (SA); Abhinav S. Mansingka, Thuwal (SA); Ahmed Gomaa Ahmed Radwan, Giza (EG); Khaled Nabil Salama, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 401 days.

(21) Appl. No.: 13/826,779

(22) Filed: Mar. 14, 2013

(65) Prior Publication Data

US 2014/0101217 A1    Apr. 10, 2014

Related U.S. Application Data

(60) Provisional application No. 61/711,390, filed on Oct. 9, 2012, provisional application No. 61/747,647, filed on Dec. 31, 2012.

(51) Int. Cl.
*G06G 7/58*    (2006.01)
*G06F 7/58*    (2006.01)

(52) U.S. Cl.
CPC . *G06F 7/582* (2013.01); *G06F 7/58* (2013.01)

(58) Field of Classification Search
None
See application file for complete search history.

(56) References Cited

U.S. PATENT DOCUMENTS

| | | | |
|---|---|---|---|
| 4,355,366 A | 10/1982 | Porter | |
| 6,108,366 A * | 8/2000 | Haartsen | 375/134 |
| 2010/0287225 A1* | 11/2010 | Dong | 708/254 |

FOREIGN PATENT DOCUMENTS

WO    WO 2009074889 A1    6/2009

OTHER PUBLICATIONS

PCT International Search Report and Written Opinion of application PCT/IB2013/003259 mailed Jul. 31, 2014, 12 pages.

(Continued)

*Primary Examiner* — Michael D Yaary
(74) *Attorney, Agent, or Firm* — Thomas |Horstemeyer, LLP

(57) ABSTRACT

Various methods and systems related to chaos-based pseudo-random number generation are presented. In one example, among others, a system includes a pseudo-random number generator (PRNG) to generate a series of digital outputs and a nonlinear post processing circuit to perform an exclusive OR (XOR) operation on a first portion of a current digital output of the PRNG and a permutated version of a corresponding first portion of a previous post processed output to generate a corresponding first portion of a current post processed output. In another example, a method includes receiving at least a first portion of a current output from a PRNG and performing an XOR operation on the first portion of the current PRNG output with a permutated version of a corresponding first portion of a previous post processed output to generate a corresponding first portion of a current post processed output.

20 Claims, 15 Drawing Sheets

(56) References Cited

OTHER PUBLICATIONS

M. Affan Zidan, et al. "Random Number Generation Based on Digital Differential Chaos", Circuits and Systems, 2011 IEEE 54th International Midwest Symposium On, IEEE, Aug. 7, 2011, 4 pages.

Yashuhiro Akizawa, et al. "Fast Random Number Generation With Bandwidth-Enhanced Chaotic Semiconductor Lasers at 8 × 50 Gb/s", IEEE Photonics Technology Letters, IEEE Service Center, Piscataway, New Jersey (US), vol. 24, No. 12, Jun. 1, 2012, pp. 1042-1044.

* cited by examiner

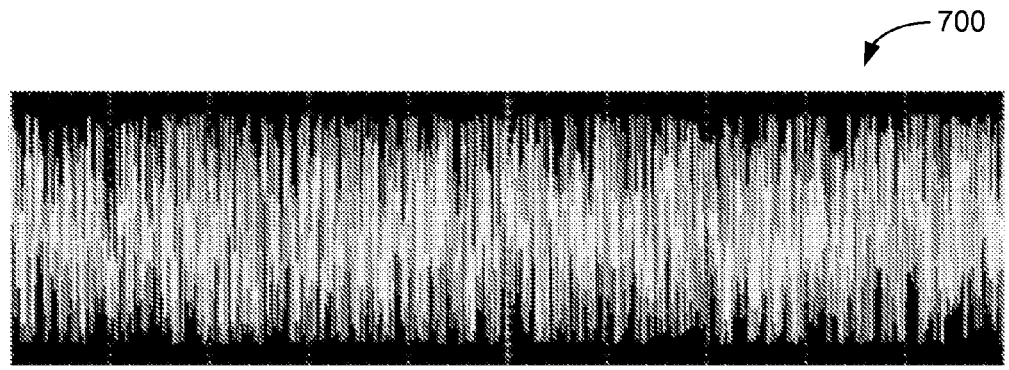
FIG. 7
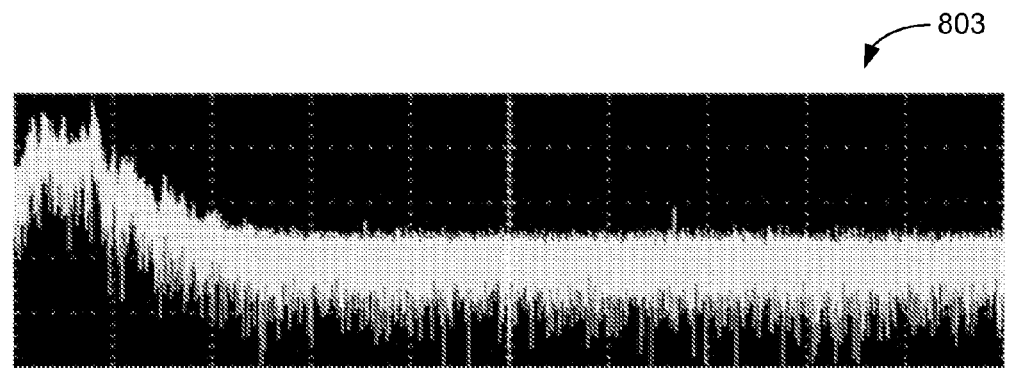
(a)
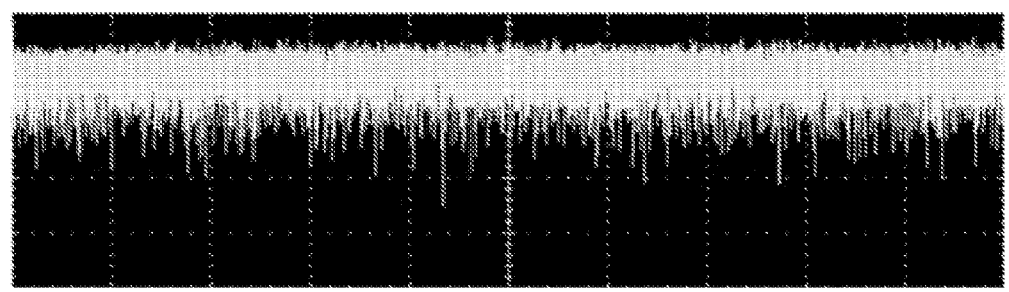
(b)
FIG. 8

NIST SP 800-22 TESTS AND XILINX VIRTEX 4 FPGA EXPERIMENTAL RESULTS FOR THE ORIGINAL, VON NEUMANN, 2-BIT XOR CORRECTOR, TRUNCATION AND PROPOSED POST-PROCESSING WITH $\alpha = 1, 2, 4, 8$. VON NEUMANN POST PROCESSING WAS IMPLEMENTED IN SOFTWARE.

| | NIST SP. 800-22 Results | | | | | | | | | | | | | |
|---|---|---|---|---|---|---|---|---|---|---|---|---|---|
| | Original | | V. Neumann | | 2-bit XOR | | Truncation | | Proposed Post Processing | | | | | |
| | | | | | | | | | $\alpha = 1$ | | $\alpha = 2$ | | $\alpha = 4$ | | $\alpha = 8$ | |
| | PV | PP | PV | PP | PV | PP | PV | PP | PV | PP | PV | PP | PV | PP | PV | PP |
| Monobits | × | 0.72 | × | 0.80 | ✓ | 1.00 | ✓ | 1.00 | ✓ | 1.00 | ✓ | 1.00 | ✓ | 0.99 | ✓ | 0.98 |
| Block Frequency | × | 0.74 | × | 0.81 | ✓ | 1.00 | ✓ | 1.00 | × | 0.94 | ✓ | 0.98 | ✓ | 0.96 | ✓ | 0.99 |
| Cumulative Sums | × | 0.71 | × | 0.80 | ✓ | 0.99 | ✓ | 1.00 | ✓ | 1.00 | ✓ | 1.00 | ✓ | 0.99 | ✓ | 0.98 |
| Runs | × | 0.60 | × | 0.64 | ✓ | 1.00 | ✓ | 1.00 | ✓ | 1.00 | ✓ | 1.00 | ✓ | 1.00 | ✓ | 0.98 |
| Longest Run | × | 0.69 | × | 0.73 | ✓ | 1.00 | ✓ | 0.98 | ✓ | 0.99 | ✓ | 0.99 | ✓ | 0.98 | ✓ | 0.98 |
| Rank | × | 0.85 | × | 0.80 | ✓ | 0.98 | ✓ | 1.00 | ✓ | 1.00 | ✓ | 0.98 | ✓ | 0.99 | ✓ | 1.00 |
| Fast Fourier Transform | × | 0.72 | × | 0.76 | ✓ | 1.00 | ✓ | 0.98 | ✓ | 1.00 | ✓ | 0.99 | ✓ | 1.00 | ✓ | 1.00 |
| Non Overlapping Template | × | 0.68 | × | 0.73 | ✓ | 0.99 | ✓ | 0.99 | ✓ | 1.00 | × | 0.95 | ✓ | 1.00 | ✓ | 0.99 |
| Overlapping Template | × | 0.69 | × | 0.73 | ✓ | 0.98 | ✓ | 1.00 | ✓ | 0.99 | ✓ | 1.00 | ✓ | 1.00 | ✓ | 0.98 |
| Universal | × | 0.71 | × | 0.74 | ✓ | 0.98 | ✓ | 0.98 | ✓ | 0.98 | ✓ | 0.99 | ✓ | 1.00 | ✓ | 0.98 |
| Approximate Entropy | × | 0.57 | × | 0.61 | ✓ | 1.00 | ✓ | 0.96 | ✓ | 1.00 | ✓ | 1.00 | ✓ | 1.00 | ✓ | 0.99 |
| Random Excursion | ✓ | 0.99 | ✓ | 0.97 | ✓ | 0.99 | ✓ | 0.99 | ✓ | 0.99 | ✓ | 0.99 | ✓ | 0.99 | ✓ | 0.99 |
| Random Excursion Variant | ✓ | 0.99 | ✓ | 0.99 | ✓ | 1.00 | ✓ | 1.00 | ✓ | 1.00 | ✓ | 1.00 | ✓ | 0.99 | ✓ | 0.99 |
| Serial | × | 0.57 | × | 0.65 | ✓ | 0.99 | ✓ | 0.99 | ✓ | 0.98 | ✓ | 0.98 | ✓ | 1.00 | ✓ | 0.99 |
| Linear Complexity | × | 0.04 | × | 0.81 | ✓ | 1.00 | ✓ | 0.98 | ✓ | 1.00 | ✓ | 0.98 | ✓ | 1.00 | ✓ | 1.00 |
| Overall Result | Fail | | Fail | | Pass | | Pass | | Fail | | Fail | | Pass | | Pass | |

| Experimental Results on the XC4VSX35-10FF668 FPGA (30,720 LUTs and 30,720 FFs) | | | | | | | |
|---|---|---|---|---|---|---|---|
| Total LUTs | 193 | 193 | 241 | 193 | 247 | 247 | 247 | 259 |
| Total Flip-Flops | 96 | 96 | 96 | 96 | 141 | 144 | 150 | 162 |
| Frequency [MHz] | 160.80 | 160.80 | 160.80 | 160.80 | 160.80 | 160.80 | 160.80 | 160.80 |
| Output Bits/Cycle | 96 | ~24 | 48 | 54 | 96 | 96 | 96 | 96 |
| Throughput [Gb/s] | 15.44 | 3.85 | 7.72 | 8.68 | 15.44 | 15.44 | 15.44 | 15.44 |

FIG. 12

SYSTEM DESCRIPTIONS, NIST SP. 800-22 RESULTS, FPGA RESULTS AND OSCILLOSCOPE SNAPSHOTS OF ATTRACTORS FOR THE ORIGINAL OUTPUT AND OUTPUT AFTER PROPOSED POST PROCESSING OF LORENZ, CHEN, ELWAKIL AND SPROTT CHAOTIC OSCILLATORS.

| | Chaotic Oscillators | | | | | | | |
|---|---|---|---|---|---|---|---|---|
| System Description | Lorenz 1403 $Y = (2-Z)X - Y$ $Z = XY - 32Z$ | | Chen 1406 $Y = \text{sgn}(X)(1-Z) + \frac{Y}{2}$ $Z = |Y| - \frac{Z}{8}$ | | Elwakil 1409 $Z = -Z - Y\varphi(Y) - X$ $\varphi(Y) = \begin{cases} 4 & Y \geq 1 \\ 0 & Y < 1 \end{cases}$ | | Sprott 1412 $Z = -\frac{X}{2} - Y + G(X)$ $G(X) = -X + 2\text{sgn}(X)$ | |
| Nonlinearity $(N, N_1, N_F, h)$ $(\alpha, \beta)$ [Note: $\alpha = 4$] | Multiplication (32,8,24,$2^{-6}$) (9,15) | | Signum, Modulus (32,5,27,$2^{-6}$) (11,20) | | Piecewise (32,5,27,$2^{-5}$) (12,20) | | Signum (32,5,27,$2^{-5}$) (6,24) | |
| | Original pv pp | Post Process pv pp | Original pv pp | Post Process pv pp | Original pv pp | Post Process pv pp | Original pv pp | Post Process pv pp |

NIST SP. 800-22 Results

| | Orig pv | Orig pp | PP pv | PP pp | Orig pv | Orig pp | PP pv | PP pp | Orig pv | Orig pp | PP pv | PP pp | Orig pv | Orig pp | PP pv | PP pp |
|---|---|---|---|---|---|---|---|---|---|---|---|---|---|---|---|---|
| Monobits | × | 0.81 | ✓ | 0.98 | × | 0.67 | ✓ | 1.00 | × | 0.64 | ✓ | 0.99 | × | 0.72 | ✓ | 0.96 |
| Block Frequency | × | 0.75 | ✓ | 0.96 | × | 0.60 | ✓ | 1.00 | × | 0.63 | ✓ | 0.99 | × | 0.64 | ✓ | 0.96 |
| Cumulative Sums | × | 0.80 | ✓ | 0.98 | × | 0.67 | ✓ | 1.00 | × | 0.63 | ✓ | 0.99 | × | 0.72 | ✓ | 0.97 |
| Runs | × | 0.64 | ✓ | 0.99 | × | 0.46 | ✓ | 0.97 | × | 0.54 | ✓ | 0.96 | × | 0.51 | ✓ | 0.98 |
| Longest Run | × | 0.61 | ✓ | 0.97 | × | 0.25 | ✓ | 1.00 | × | 0.43 | ✓ | 1.00 | × | 0.30 | ✓ | 0.96 |
| Rank | × | 0.79 | ✓ | 0.99 | × | 0.56 | ✓ | 1.00 | × | 0.67 | ✓ | 1.00 | × | 0.60 | ✓ | 0.98 |
| Fast Fourier Transform | × | 0.71 | ✓ | 0.99 | × | 0.56 | ✓ | 0.96 | × | 0.63 | ✓ | 0.98 | × | 0.62 | ✓ | 0.97 |
| Non Overlap. Template | × | 0.64 | ✓ | 0.99 | × | 0.19 | ✓ | 0.98 | × | 0.58 | ✓ | 0.98 | × | 0.40 | ✓ | 0.98 |
| Overlapping Template | × | 0.63 | ✓ | 0.97 | × | 0.22 | ✓ | 0.99 | × | 0.40 | ✓ | 0.99 | × | 0.28 | ✓ | 0.98 |
| Universal | × | 0.67 | ✓ | 1.00 | × | 0.31 | ✓ | 0.99 | × | 0.45 | ✓ | 1.00 | × | 0.31 | ✓ | 0.98 |
| Approximate Entropy | × | 0.56 | ✓ | 1.00 | × | 0.14 | ✓ | 0.97 | × | 0.37 | ✓ | 0.99 | × | 0.18 | ✓ | 0.97 |
| Random Excursion | ✓ | 0.96 | ✓ | 0.98 | × | · | ✓ | 0.99 | × | · | ✓ | 0.99 | × | 0.90 | ✓ | 0.99 |
| Rand. Excur. Variant | ✓ | 1.00 | ✓ | 1.00 | × | · | ✓ | 0.99 | × | · | ✓ | 0.99 | × | 0.96 | ✓ | 0.99 |
| Serial | × | 0.57 | ✓ | 0.99 | × | 0.49 | ✓ | 0.98 | ✓ | 0.38 | ✓ | 0.99 | × | 0.23 | ✓ | 0.97 |
| Linear Complexity | × | 0.89 | ✓ | 0.98 | ✓ | 0.99 | ✓ | 0.97 | ✓ | 0.96 | ✓ | 0.99 | × | 0.72 | ✓ | 0.98 |
| Overall Result | Fail | | Pass | | Fail | | Pass | | Fail | | Pass | | Fail | | Pass | |

Experimental Results on the XC4VSX35-10FF668 FPGA (30,720 LUTs and 30,720 FFs)

| | | | | | | | | |
|---|---|---|---|---|---|---|---|---|
| Total LUTs | 2711 | | 2783 | | 315 | | 409 | | 215 | | 311 | | 185 | | 275 |
| Total Flip-Flops | 96 | | 168 | | 96 | | 189 | | 96 | | 192 | | 96 | | 186 |
| Frequency [MHz] | 56.92 | | 56.92 | | 130.71 | | 130.71 | | 146.56 | | 146.56 | | 162.42 | | 162.42 |
| Output Bits/Cycle | 96 | | 96 | | 96 | | 96 | | 96 | | 96 | | 96 | | 96 |
| Throughput [Gb/s] | 5.46 | | 5.46 | | 12.55 | | 12.55 | | 14.07 | | 14.07 | | 15.59 | | 15.59 |

FIG. 14

| System | | Area (Gc) | T.put (Mb/s) | FOM | NIST |
|---|---|---|---|---|---|
| LFSR | | 223 | 500 | 2.24 | Fail |
| Addabbo, 2007 | Rényi Map | 3988 | 200 | 0.05 | Pass |
| Chen, 2010 | Log. Map | 9622 | 200 | 0.02 | Pass |
| Li, 2010 | Log. Map | 9136 | 200 | 0.02 | Fail |
| Chen, 2010 | Log. Map | 31655 | 3200 | 0.10 | Pass |
| Zidan, 2011 | ODE | 2464 | 1180 | 0.48 | Pass |
| Li, 2012 | Log. Map | 11903 | 6400 | 0.54 | Pass |
| This Work (w/ Post Processing) | | | | | |
| Lorenz | ODE | 23608 | 5464 | 0.23 | Pass |
| Chen | ODE | 4784 | 12548 | 2.62 | Pass |
| Elwakil | ODE | 4024 | 14069 | 3.50 | Pass |
| Sprott (Sgn) | ODE | 3688 | 15592 | 4.23 | Pass |
| Sprott (Max) | ODE | 3176 | 15437 | 4.86 | Pass |

FIG. 19

CHAOS-BASED PSEUDO-RANDOM NUMBER GENERATION

CROSS REFERENCE TO RELATED APPLICATIONS

This application claims priority to co-pending U.S. provisional application entitled "CHAOS-BASED PSEUDO-RANDOM NUMBER GENERATION" having Ser. No. 61/711,390, filed Oct. 9, 2012, and co-pending U.S. provisional application entitled "CHAOS-BASED PSEUDO-RANDOM NUMBER GENERATION" having Ser. No. 61/747,647, filed Dec. 31, 2012, both of which are hereby incorporated by reference in their entirety.

BACKGROUND

Pseudo-random number generators (PRNGs) are important components in communication systems, cryptography, microprocessors, and stochastic simulations. Chaos is a non-linear deterministic system that expresses random behavior. Realizations of analog chaos circuits have been considered as one technique of creating a random number generator. Digital design can provide benefits over an analog implementation in terms of area efficiency, repeatability, portability, power consumption, and integration with integrated circuit (IC) technology.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7 is an example of an output time series of the post processing of FIG. 5 in accordance with various embodiments of the present disclosure.

FIG. 8 includes Fast Fourier Transforms (FFTs) of examples of outputs including FIG. 8(a) the unprocessed chaos generator (original) output of FIG. 3 and FIG. 8(b) the post processed output of FIG. 7 in accordance with various embodiments of the present disclosure.

FIG. 12 includes a table summarizing testing results of pseudo-random number generation with and without post processing in accordance with various embodiments of the present disclosure.

FIG. 14 includes a table summarizing testing results of pseudo-random number generation with and without post processing in accordance with various embodiments of the present disclosure.

FIG. 19 includes a table summarizing testing results of pseudo-random number generation with and without post processing in accordance with various embodiments of the present disclosure.

DETAILED DESCRIPTION

Figure 1:
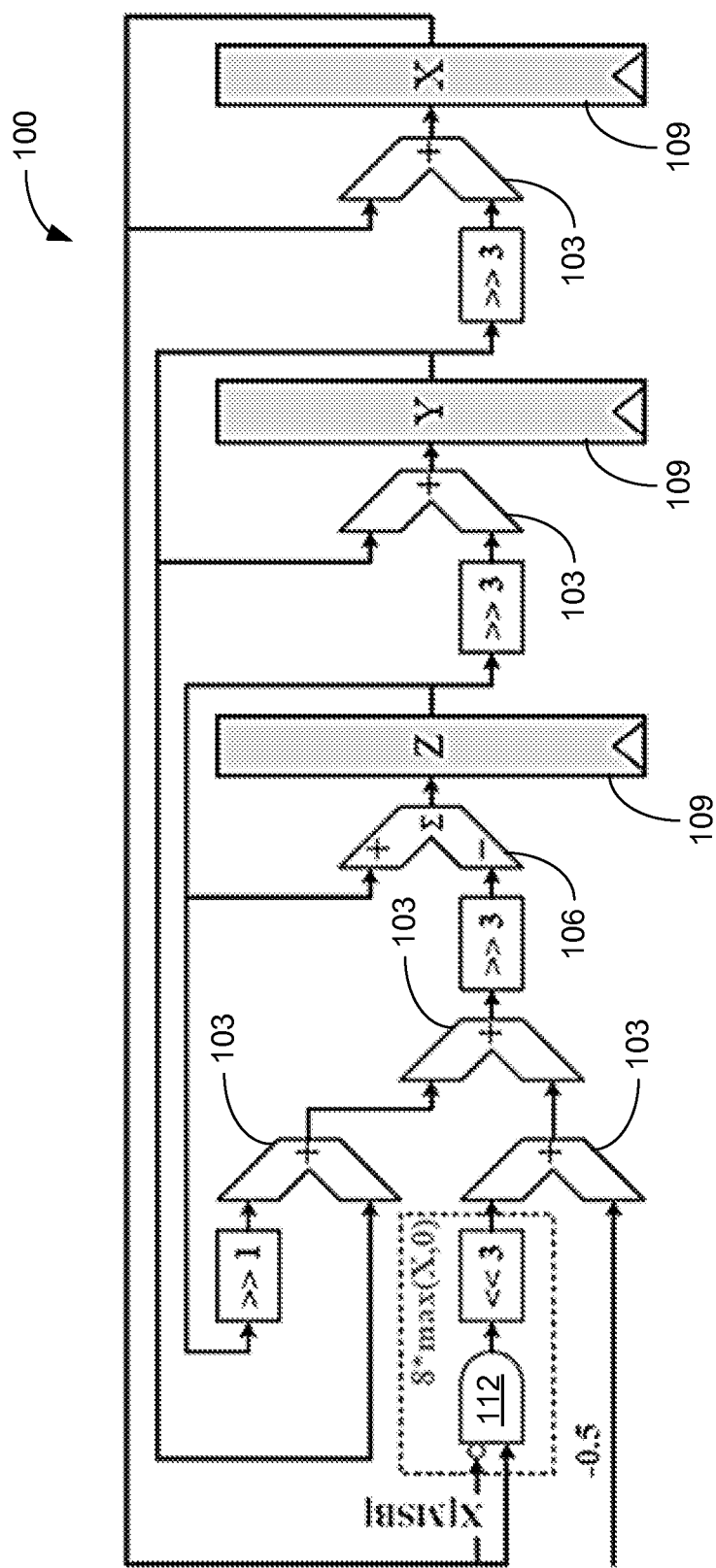
FIG. 1 is a graphical representation of an example of a fully digital third order ODE-based chaos generator with maximum function nonlinearity in accordance with various embodiments of the present disclosure.

Disclosed herein are various embodiments of methods and systems related to chaos-based pseudo-random number generation. Reference will now be made in detail to the description of the embodiments as illustrated in the drawings, wherein like reference numbers indicate like parts throughout the several views.

With a deterministic yet unpredictable nature, chaos-based pseudo-random number generators (CB-PRNGs) can be used to implement a chaotic equation that produces randomized symbols when initialized by a seed. Many CB-PRNGs may be digitally realized using chaotic maps and/or the numerical solution of differential equations. The performance of PRNGs is evaluated on the basis of period length, unpredictability, and other statistical properties. Digital designs can provide several benefits over analog implementations in terms of area efficiency, repeatability, portability, power consumption, and ability to integrate with IC technologies. Digital CB-PRNGs suffer from dynamical degradations due to quantization error and finite representation of system states, including loss of ergodicity and shorter pseudo-orbits. Good post processing techniques may be used to overcome statistical flaws in the output of CB-PRNGs. For example, the Von Neumann technique, XOR (exclusive OR) correctors, truncation of defective bits, hash-function post processing, and linear code correctors may be used to overcome bias and enhance random properties of PRNGs. While these solutions can mitigate some of the statistical defects, none preserves the raw random number generator (RNG) throughput and some can incur a huge hardware overhead.

A nonlinear XOR-based post processing technique with rotation and feedback can be used to suppress short-term predictability and maximize RNG throughput from a chaotic system with low hardware cost. The technique was evaluated against known techniques using a digital implementation of a third order jerk chaotic system with maximum function nonlinearity. A positive maximum Lyapunov exponent of 0.1362 confirmed chaotic dynamics. The implementation showed superior performance, enabling full utilization of all output bits for a CB-PRNG with successful passage of all NIST SP. 800-22 tests. The technique was also applied to different chaotic oscillators to illustrate its generalized effect resulting in comparable randomness enhancement. The maximum nonlinearity system was verified on a Xilinx Virtex 4 FPGA, indicating logic utilization less than 0.84% and throughput up to 15.44 Gbits/s for 32-bit implementations. The resulting CB-PRNG can be applied in image encryption with improved results (e.g., security results) compared to the native chaos.

I. Digital Chaos Generator

Hardware implementations of differential equation based chaotic systems that are multiplier-free can achieve higher throughput while occupying less area. A third order chaotic system was implemented utilizing a maximum value function (or maximum comparison function) as the nonlinearity. The third order chaotic system is described by the following set of first-order ODEs:

$$\dot{X}=Y; \qquad \text{EQN. 1a}$$

$$\dot{Y}=Z \qquad \text{EQN. 1b}$$

$$\dot{Z}=-0.5Z-Y-8\max(X,0)+0.5 \qquad \text{EQN. 1c}$$

The equilibrium point of the system is determined at $(\dot{X},\dot{Y},\dot{Z})=(0, 0, 0)$. This gives $Y=0$, $Z=0$ and $8\max(X,0)=0.5$, giving the equilibrium point at $(X^*,Y^*,Z^*)=(0.0625,0,0)$. At this point, the Jacobian (J) and its trace (or sum of diagonal terms) are given as:

$$J = \begin{bmatrix} 0 & 1 & 0 \\ 0 & 0 & 1 \\ -8 & -1 & -0.5 \end{bmatrix}, \qquad \text{EQN. 2}$$

$$\text{trace}(J) = -0.5.$$

A negative trace indicates a dissipative chaotic flow, while the eigenvalues of the chaotic system at the equilibrium point are the roots of the characteristic equation derived from J:

$$s^3 + 0.5s^2 + s + 8 = 0 \Longrightarrow s = \left(-2, \frac{3 \pm i\sqrt{55}}{4}\right). \qquad \text{EQN. 3}$$

One negative real eigenvalue and a complex-conjugate pair of eigenvalues with positive real part indicate a saddle point of index 2, suggesting a chaotic attractor. Initial values $\{X_0,Y_0,Z_0\}$ can be arbitrarily chosen so long as $\{0.0625,0,0\}$ is avoided.

The system of EQNS. 1a-1c was digitally implemented in hardware for the first time by realizing the numerical solution of the ODE. The Euler, Runge Kutta and Midpoint method are numerical techniques that may be used for solving ODEs, among which the Euler approximation (as adopted here) produces the best chaotic response, occupies the lowest area, and provides the highest throughput. The step-size is fixed to be $h=2^{-3}$, the highest possible value to provide the greatest nonlinearity, resulting in a non-linear feedback pipeline:

$$X_{t+h}=X_t+hY_t; \qquad \text{EQN. 4a}$$

$$Y_{t+h}=Y_t+hZ_t; \qquad \text{EQN. 4b}$$

$$Z_{t+h}=Z_t+hJ(X_t,Y_t,Z_t). \qquad \text{EQN. 4c}$$

Referring to FIG. 1, shown is an example of a circuit diagram for obtaining the numerical solution of EQNS. 4a-4c. FIG. 1 depicts an example of a fully digital third order ODE-based chaos generator 100 with maximum function nonlinearity in X. A fixed point two's complement format is used with five bits allocated to the sign and integer part and the remaining to the fractional part. All constants and the Euler step size were optimized to powers of 2 to simplify scalar multiplications to arithmetic shifts. The function max (X,0) is calculated by performing a bitwise AND operation on every bit of X with the inverse of the most significant bit. This in effect yields the output as zero whenever X is negative and X otherwise, thus giving the appropriate functionality. For an N-bit implementation, the total component requirement is thus five N-bit adders 103, one N-bit subtractor 106, three N-bit registers 109, and N 2-input AND gates 112. The system has three outputs $\{X, Y, Z\}$ each of which is N-bits wide for a total of 3N output bits.

Figure 2:
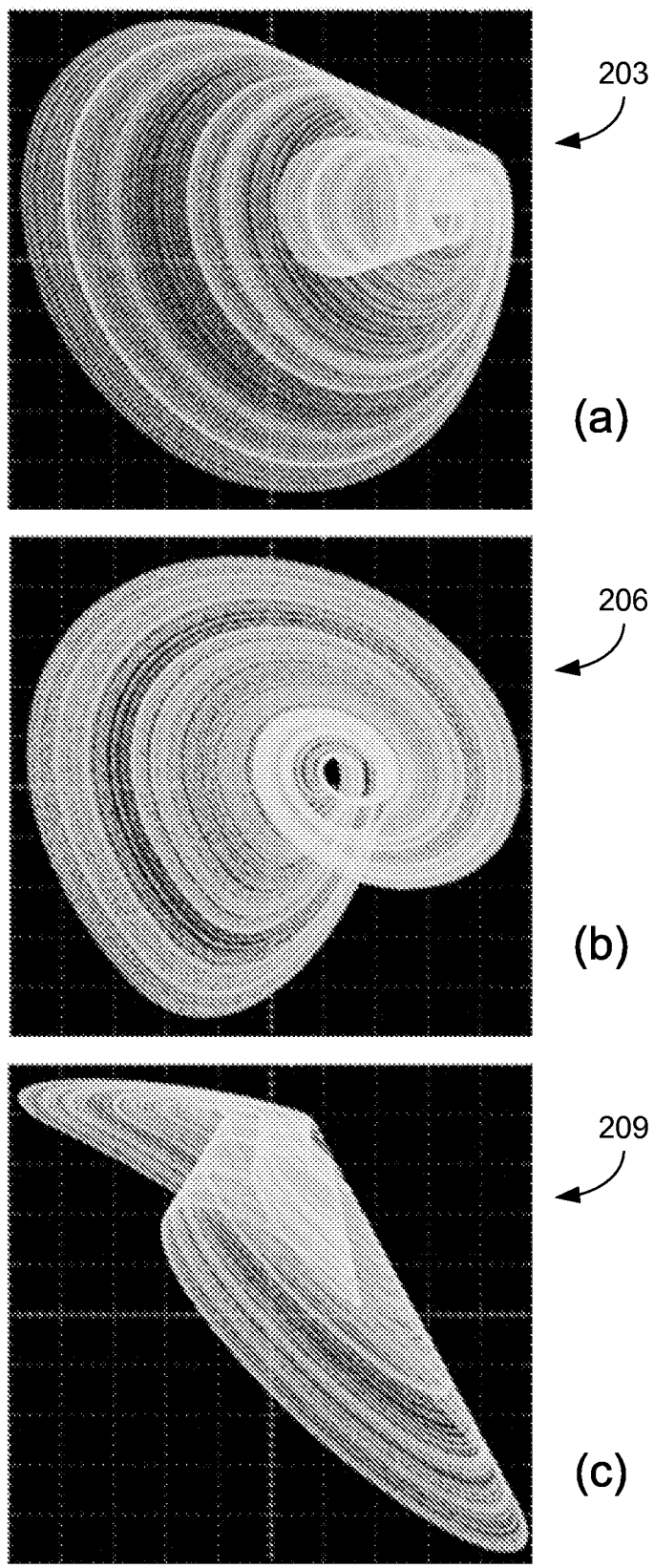
FIG. 2 illustrates examples of attractors including FIG. 2(a) X-Y, FIG. 2(b) Y-Z, and FIG. 2(c) Z-X attractors (or phase plots) of the outputs of the chaos generator of FIG. 1 in accordance with various embodiments of the present disclosure.
Figure 3:
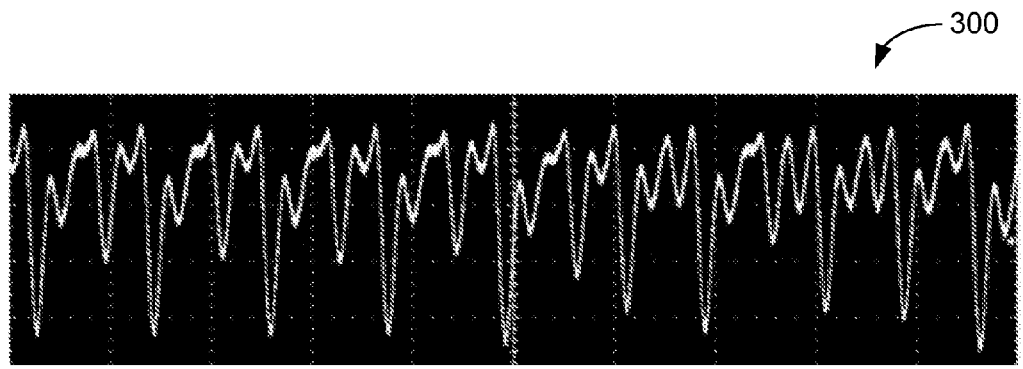
FIG. 3 is an example of an output time series of the chaos generator of FIG. 1 in accordance with various embodiments of the present disclosure.

Referring next to FIG. 2, shown are the attractors (or X-Y-Z phase plots) of the output of the circuit of FIG. 1, which exhibits very good correspondence with the corresponding analog attractor. FIG. 2 depicts the (a) X-Y attractor 203, (b) Y-Z attractor 206, and (c) Z-X attractor 209. FIG. 3 shows the output time series 300 of X, where the results were drawn on an oscilloscope from the generator 100 implemented on a Xilinx Virtex 4 FPGA. Phase space boundedness is a necessary but insufficient condition to indicate chaos. Finite fixed point representations adopted for the digital realization of chaotic systems cause the output to follow effectively periodic trajectories that are pseudo-chaotic and approximate the truly chaotic trajectories of the ODE.

A positive maximum Lyapunov exponent (MLE) for the output time series will indicate the presence of chaotic dynamics. Given an arbitrary change in initial conditions, the MLE theoretically approximates the long-term divergence in the solution by $\delta S(t) \approx e^{\lambda t} S(\delta t)$, with a positive MLE confirming the existence of chaos. While this technique only applies to chaotic systems defined over continuous phase spaces, the calculation of the MLE may be enabled from a time series of discrete data and thus can treat the digital output as if it were sampled from a truly chaotic source. Using a 32-bit implementation, the MLE was found to be 0.1362. While the MLE of such systems can decrease with increasing system precision due to lower truncation nonlinearities, it remains positive and is thus sufficient to indicate chaos.

II. Nonlinear Post Processor

The most-significant bits are the primary contributors in constructing the attractor shapes illustrated in FIG. 2. Consequently, they have slower transition rates compared to bits with lower significance, and thus represent the short-term predictability apparent in all chaotic systems. In a digital context, this creates an uneven distribution of pseudo-randomness across the output bits. The most significant bits are not only biased but also highly correlated while the bits with lower significance show good statistical randomness. This makes a strong case for efficient post processing to correct flaws and ensure that the entire output has statistically random properties. For example, XOR-based correctors can be used as efficient solutions to remove statistical bias with a controllable hardware cost, according to the equation:

$$E(X \oplus Y) \approx \frac{1}{2} - 2\left(\mu - \frac{1}{2}\right)\left(v - \frac{1}{2}\right) - \frac{1}{2}\rho. \quad \text{EQN. 5}$$

where X and Y are independent random variables with $E(X)=\mu$ and $E(Y)=v$ denoting expectation values and $\rho$ denoting correlation between X and Y. Assuming that X represents an ideal random variable ($\mu=0.5$) and Y is a variable loaded with bias ($v \neq 0.5$), the expression indicates that the XOR operation gives a result with lower bias ($E(X \oplus Y) \approx 0.5$) provided the correlation is low ($\rho \approx 0$).

A subset of the random bits (e.g., bits of low significance) may be used by the post processor to suppress the bias in the non-random bits (e.g., bits of high significance) through a non-linear XOR operation with rotation and feedback. Such random bits are statistically independent by the nature of the chaotic dynamics, which is similar to noise. Adding noise to the most significant bits creates large deviations in the trajectories when compared to the solution of the ODE, resulting in a random walk process in discrete time that emulates the instability in the original chaotic trajectories.

Detection of Random Bits: The NIST SP. 800-22 test suite assesses the statistical characteristics of the output bitstreams, each of which is isolated and individually examined. Bitstreams that fail the NIST tests are judged to be generated at defective bit locations. From a digital implementation perspective, the number of defective bits in the bus width depends on the number of integer bits in the fixed point representation, the Euler step size, and the system characteristics, all of which are held constant here. It was found that a set of bits with high significance from the X, Y and Z outputs of the generator 100 of FIG. 1 were statistically defective.

Figure 4:
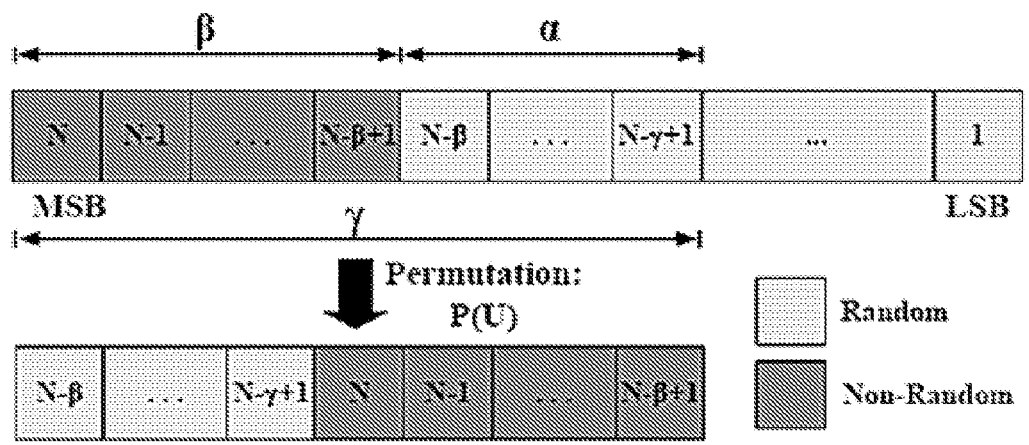
FIG. 4 is a graphical representation of a bit location permutation for post processing a chaos generator output in accordance with various embodiments of the present disclosure.

Bit Location Permutation: Referring to FIG. 4, shown is a representation of the disclosed bit location permutation. Assume that output branches {X,Y,Z} are corrected to the corresponding outputs {U,V,W}, respectively, after applying the post processing. As illustrated in FIG. 4, within a single branch, let the number of statistically defective high significance bits be β and let the total bus width be N bits. In the disclosed technique, the β defective bits are overlapped, partially or fully, with α statistically random bits from the same branch. The resulting bus of width γ=α+β is rotated right by β-bits, creating a permutation P. This permutation operation is illustrated in FIG. 4 and is described as follows (where B is bit position and U represents a bus output of width N):

$$P(U[B]) = \begin{cases} U[B-\beta] & B \in (N-\alpha, N] \\ U[B+\alpha] & B \in (N-\gamma, N-\alpha]. \end{cases} \quad \text{EQN. 6}$$

Feedback and XORing: The output U may be delayed one cycle, permuted, fedback, and bitwise XORed with the corresponding un-rotated bits of the native output from the current cycle, described mathematically as follows:

$$U_i[B] = \begin{cases} X_i[B] \oplus P(U_{i-1}[B]) & B \in (N-\gamma, N] \\ X_i[B] & B \in [1, N-\gamma]. \end{cases} \quad \text{EQN. 7}$$

where $\{X_i\}$ represents the N-bit native chaotic output, $\{U_i\}$ represents the N-bit post processed output, $P(U_{i-1})$ represents the permutation described in EQN. 6 and FIG. 4, B represents the bit position and i denotes the iteration number. The resultant output bit stream is linearly independent from the bits constituting the operation due to the delay and feedback.

Choosing an Overlap Width: The disclosed post processing technique utilizes α statistically random bits to reduce the bias in the most significant β bits of each output branch. The correlation value ρ of EQN. 5 is inversely proportional to the size of α given the high correlation initially depicted in the most significant bits of the native output. Thus, the width of α is tuned such that $\epsilon \leq \alpha \leq \beta$ where $\epsilon$ is the minimum number of random bits required for effective reduction of bias (given $\epsilon \geq 1$) and is dependent on the severity of the correlation ρ in the top β bits, the system characteristics, and implementation parameters. It may be experimentally determined. Hardware efficiency motivates the upper bound for $\alpha \leq \beta$ wherein XOR operations between bits that are already statistically random bits is avoided.

Figure 5:
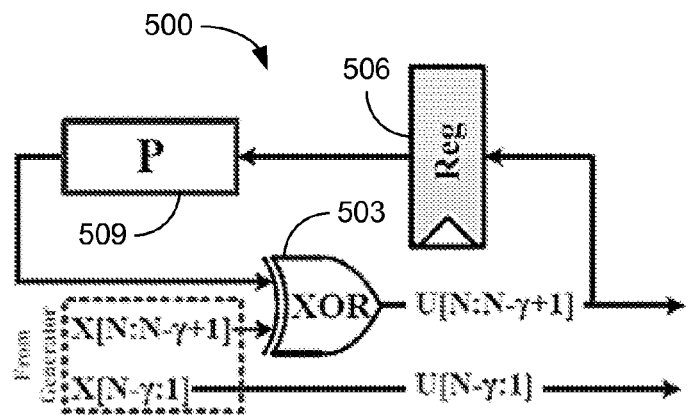
FIG. 5 is a graphical representation of an example of a post processing circuit for implementing the bit location permutation of FIG. 4 in accordance with various embodiments of the present disclosure.

Referring now to FIG. 5, shown is an example of a post processing circuit 500 to suppress the bias in the non-random bits of a PRNG output, where P represents the permutation operation of EQN. 6. The total hardware utilization for the post processor 500 is γ2-input XOR gates 503 and one γ-bit register 506. The permutation 509 is implemented through a re-ordering of the γ bits (or bit locations) from register 506 and requires no hardware. In the case of the chaos generator 100 of FIG. 1, each output branch {X,Y,Z} of the generator 100 can be post processed to provide corresponding outputs {U,V,W}. For example, the γ bits from the X output with the highest significance (e.g., X[N:N−γ+1]) are provided to XOR gates 503, where they are bitwise XORed with the permuted bits from register 506. The XORed bits are provided as the γ bits with the highest significance of the current output (e.g., U[N:N−γ+1]). The current output bits U[N:N−γ+1] are also stored in register 506 for permutation during the next cycle. In some implementations, the current U[N:N−γ+1] output bits may be delayed for a plurality of cycles before being XORed with the current X[N:N−γ+1] bits. The N−γ bits with lower significance from the generator output (e.g., X[N−γ:1]) are passed through to provide the current output bits with lower significance (e.g., U[N−γ:1]).

III. Experimental Results

Figure 6:
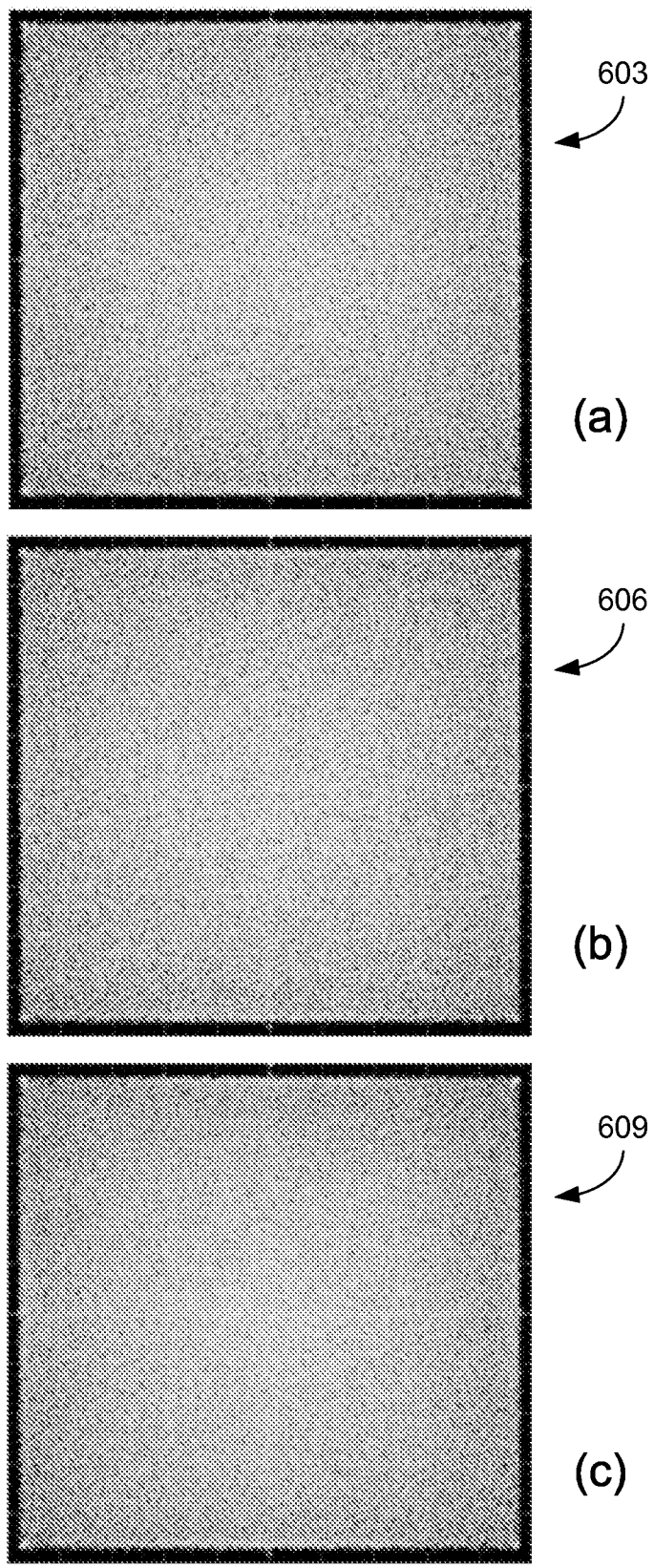
FIG. 6 illustrates examples of attractors including FIG. 6(a) U-V, FIG. 6(b) V-W, and FIG. 6(c) W-U attractors (or phase plots) of the output of the post processing of FIG. 5 in accordance with various embodiments of the present disclosure.

Testing was performed using the chaotic generator 100 of FIG. 1 and the post processing circuit 500 of FIG. 5. The defective bits in each of {X,Y,Z} were experimentally verified to be β=14 with the minimum random bits required for bias reduction determined as $\epsilon=4$. The system output (e.g., statistical characteristics) was enhanced after applying the post processing of FIG. 5. Referring to FIG. 6, shown are the attractors (or U-V-W phase plots) of the output of the post processing with α=4. FIG. 6 depicts the (a) U-V phase plot 603, (b) V-W phase plot 606, and (c) W-U phase plot 609 in which values are seen to be uniformly distributed. The post processing enables full coverage of the phase space when compared to the original attractors in FIG. 2 due to the large divergence in the trajectories, indicating period extension for the same bus width, arising from the introduction of additional nonlinearities through the post processor 500.

Referring next to FIG. 7, shown is the output time series 700 of U with $\alpha=4$. The results were drawn on an oscilloscope from the post processing 500 implemented on a Xilinx Virtex 4 FPGA. A comparison of the output time series 300 of X from FIG. 3 and the output time series 700 of U in FIG. 7 reveals that short-term predictability of the generator output 300 is completely dissolved when observing the post processed output 700. FIG. 8 shows the experimentally obtained Fast Fourier Transform (FFT) results for (a) the native X and (b) the post processed U with $\alpha=4$. The FFT 803 of the native output X and the FFT 806 of the post processed output U show that the post processing is able to efficiently spread signal power over the whole spectrum range ($f_s/2$) and give the appearance of white noise, desirable for many applications (e.g., security applications).

Figures 9, 10:
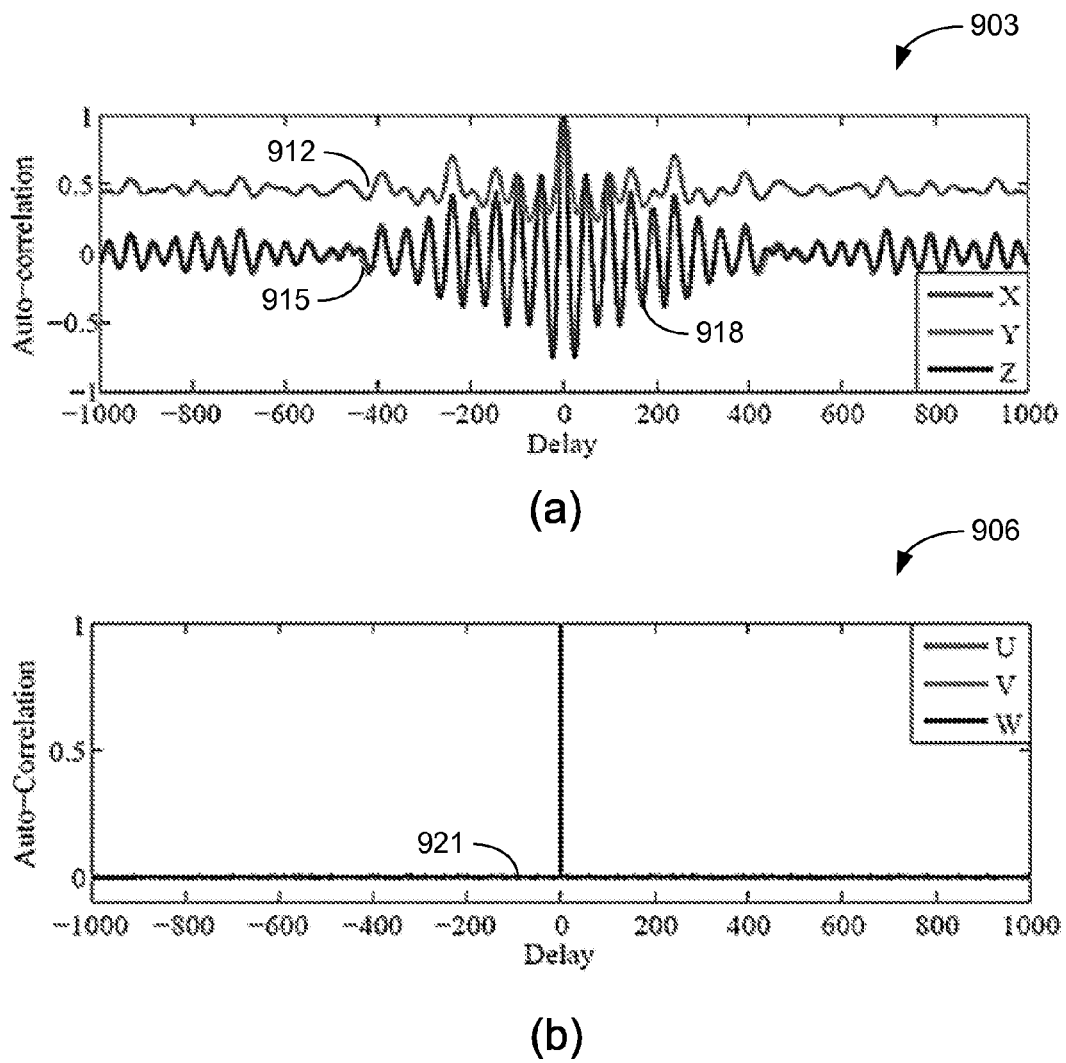
FIG. 9 includes plots of examples of the auto-correlation of examples of FIG. 9(a) the unprocessed chaos generator (original) and FIG. 9(b) the post processed outputs in accordance with various embodiments of the present disclosure.
FIG. 10 is a table of the chaos generator outputs {X, Y, Z} and post processor outputs {U, V, W} in accordance with various embodiments of the present disclosure.

Referring to FIG. 9, shown are (a) the auto-correlation 903 of {X,Y,Z} and (b) the auto-correlation 906 of {U,V,W} to quantitatively assess the short-term predictability with a sample size of 2,000,000. The outputs X (curve 912), Y (curve 915), and Z (curve 918) of the original chaotic system are highly correlated, and therefore predictable, with the Y and Z outputs (curves 915 and 918) substantially overlapping and the X output (curve 912) exhibiting a higher auto-correlation. In contrast, the post processed outputs for all three outputs are nearly identical (curve 921) with a favorable delta-like auto-correlation. The cross-correlation coefficients are shown in the table of FIG. 10, where it can be seen that the post processing suppresses the native X-Y-Z cross-correlations. These findings indicate that the disclosed post processing has eliminated bias and suppressed short-term predictability.

Figure 11A:
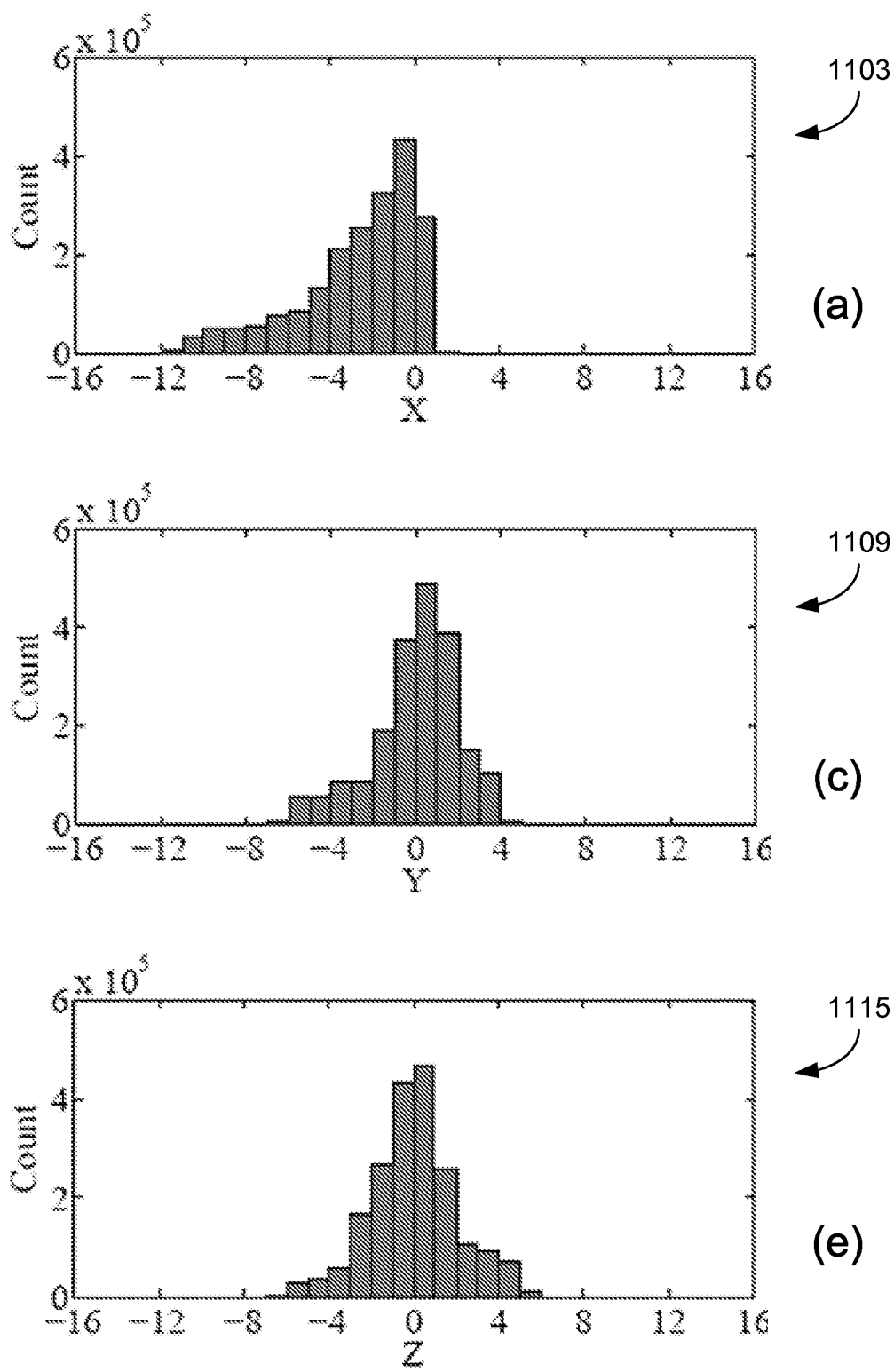
FIGS. 11A and 11B include examples of histograms of FIG. 11A(a) X output, FIG. 11A(c) Y output, and FIG. 11A(e) Z output of the chaos generator of FIG. 1 and histograms of FIG. 11B(b) U output, FIG. 11B(d) V output, and FIG. 11B(f) W output of the post processor of FIG. 5 in accordance with various embodiments of the present disclosure.
Figure 11B:
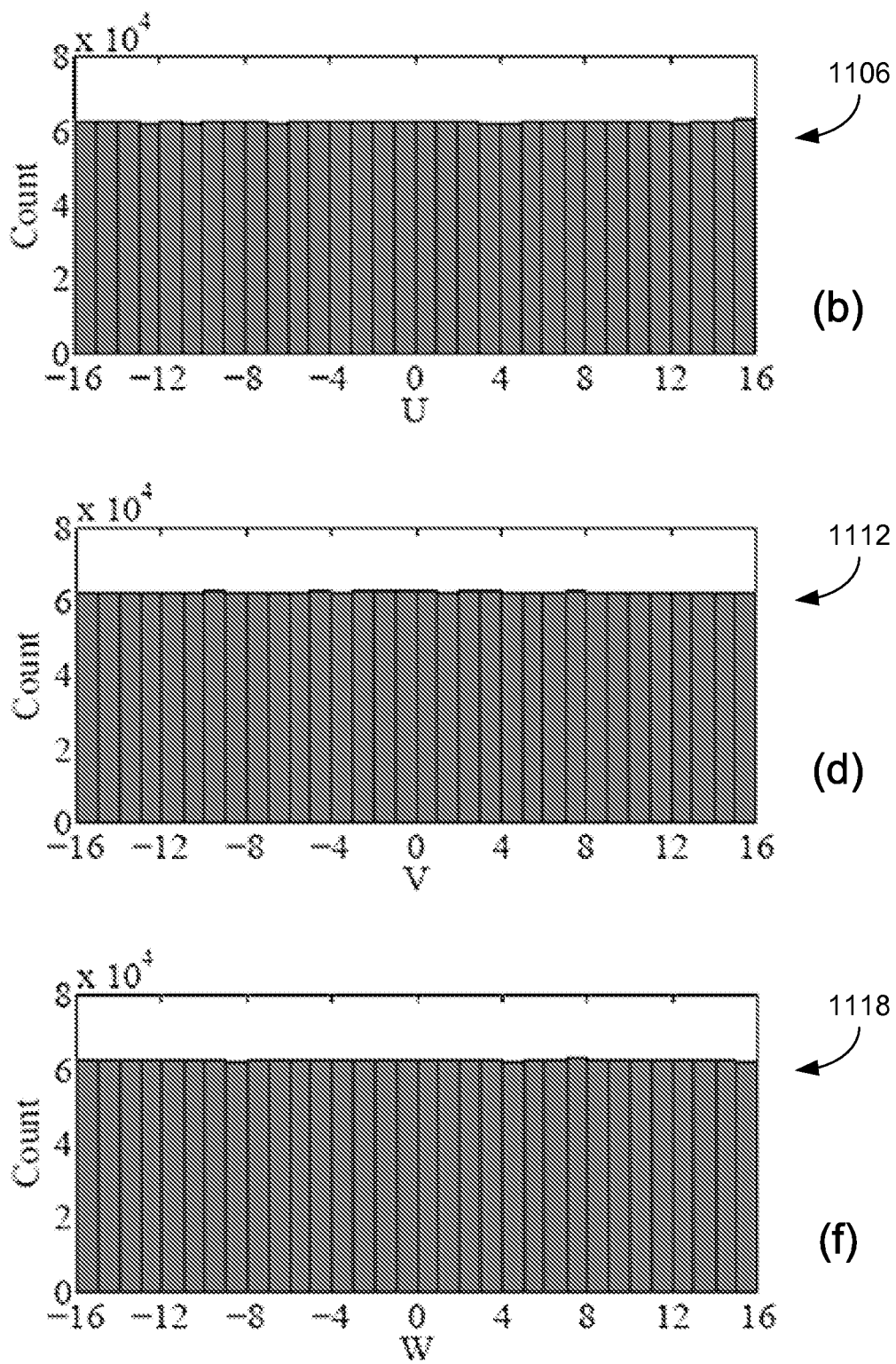

Referring now to FIGS. 11A and 11B, shown are histograms of the chaos generator outputs {X,Y,Z} and post processor outputs {U,V,W} with $\alpha=4$. The quality of the distribution of random variables in the phase space can be evaluated by analyzing the histograms of the outputs. FIGS. 11A and 11B provide for comparison of the (a) X output histogram 1103 with the (b) U output histogram 1106, the (c) Y output histogram 1109 with the (d) V output histogram 1112, and the (e) Z output histogram 1115 with the (f) W output histogram 1118 over 2,000,000 iterations and essentially approximates the probability density function of the respective outputs. The post processing results in a desired uniform distribution of the {U,V,W} outputs, spreading the random values equally over the full range specified by the 5-bit integer width. The NIST SP. 800-22 statistical test suite was used to assess the properties of the system output using the 2,000,000 iterations.

FIG. 12 shows a table that summarizes the NIST results for a 32-bit implementation of the original system and compares the performance of the disclosed post processing technique with Von Neumann post processing, 2-bit simple XOR correction and truncation of defective bits. The outputs of the three states for each iteration were concatenated together into a single sample with a size of 96-bits. The results are represented by the proportion of passing sequences (PP) and the validity of P-value distribution (PV). The Von Neumann correction examines successive non-overlapping pairs of bits from a single bitstream and produces the first bit only if the pair is different, giving a compression ratio of 4 on average. The Von Neumann correction technique was applied through software and with variable-latency. In the 2-bit simple XOR correction, pairs of bits were taken from the biased and non-biased sections of the N-bit bus (i.e., bit N is compared with bit 1, bit N−1 with bit 2, etc.) and XORed, giving a compression ratio of 2. Truncation eliminated statistically defective bits and thus does not require hardware. The results in the table of FIG. 12 show that the disclosed post processing technique provides full utilization of the entire bus width and passage of tests for all bits. Moreover, the minimum value for efficient bias reduction of the statistically defective bits is verified as $\alpha=\epsilon=4$ with $\beta=14$ in each of {X,Y,Z}.

Figure 13:
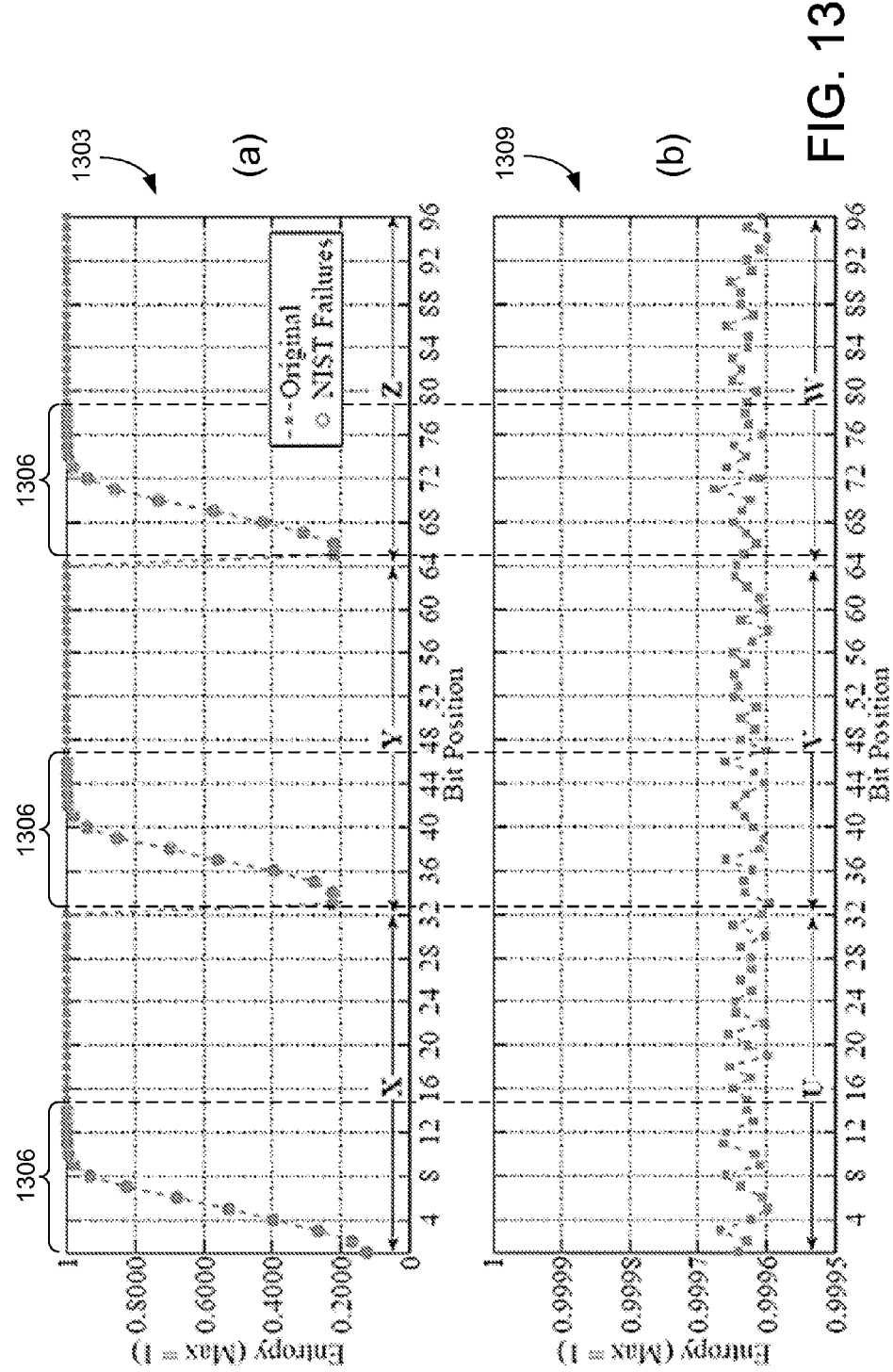
FIG. 13 includes plots of examples of output bit entropy for FIG. 13(a) the chaos generator outputs {X, Y, Z} and FIG. 13(b) the post processor outputs {U, V, W} in accordance with various embodiments of the present disclosure.

Of particular interest is the information entropy associated with each output bit, a firm indicator of long-term unpredictability of bitstreams. For the implemented system, entropy is assessed for the entire 96-bit output for a 1,000,000 bit sample, using the mathematical formulation described in "A statistical test suite for random and pseudorandom number generators for cryptographic applications" by Rukhin et al. (NIST Special Publication 800-22, 2010) with an order of 10. In base 2, the maximum entropy per bit is 1, for a fair coin-toss. Referring to FIG. 13, shown is the entropy of the bit positions for (a) the chaos generator outputs {X,Y,Z} and (b) the post processor outputs {U,V,W} with $\alpha=4$. When the entropy graph 1303 for outputs {X,Y,Z} is plotted on a scale of 0-1, it can be seen in FIG. 13(a) that the high-significance bits have very low entropy. In particular, the high-significance bits 1306 that failed the NIST SP. 800-22 tests are highlighted ("O"), indicating that a very high confidence in good entropy is needed for passage of the tests. FIG. 13(b) shows the entropy graph 1309 for outputs {U,V,W} after applying the disclosed post processing ($\alpha=4$), which is plotted on a scale of 0.9995-1. The entropy enhancement in the high-significance bits 1306 is evident such that all output bits are now within 0.041% of the maximum value of 1 and each bitstream passes the NIST tests. Note that since the Von Neumann and 2-bit XOR correction techniques compress the output, only this technique allows full utilization of all output bits.

The performance of the disclosed post processing technique was also evaluated for four different chaotic oscillators: Lorenz, Chen, Elwakil, and Sprott. The different chaotic oscillators include different nonlinearities: multiplication in Lorenz, modulus function in Chen, piecewise function in Elwakil, and signum nonlinear function in Sprott. Referring to FIG. 14, shown is a table providing the system description and the implementation parameters: bus width (N), integer width ($N_I$), fraction width ($N_F$), Euler step size (h) and post processing parameters ($\alpha,\beta$) for the four chaotic systems: Lorenz 1403, Chen 1406, Elwakil 1409, and Sprott 1412. In all cases, $\alpha=\epsilon$ such that hardware efficiency is maximized. The table of FIG. 14 summarizes the NIST SP. 800-22 test results before and after applying the disclosed post processing for each chaotic system. The results verify the generalized behaviour of the disclosed post processing for different CB-PRNGs with randomness enhancement, full utilization of the bus width and suppression of short-term predictability in each case.

Figure 15:
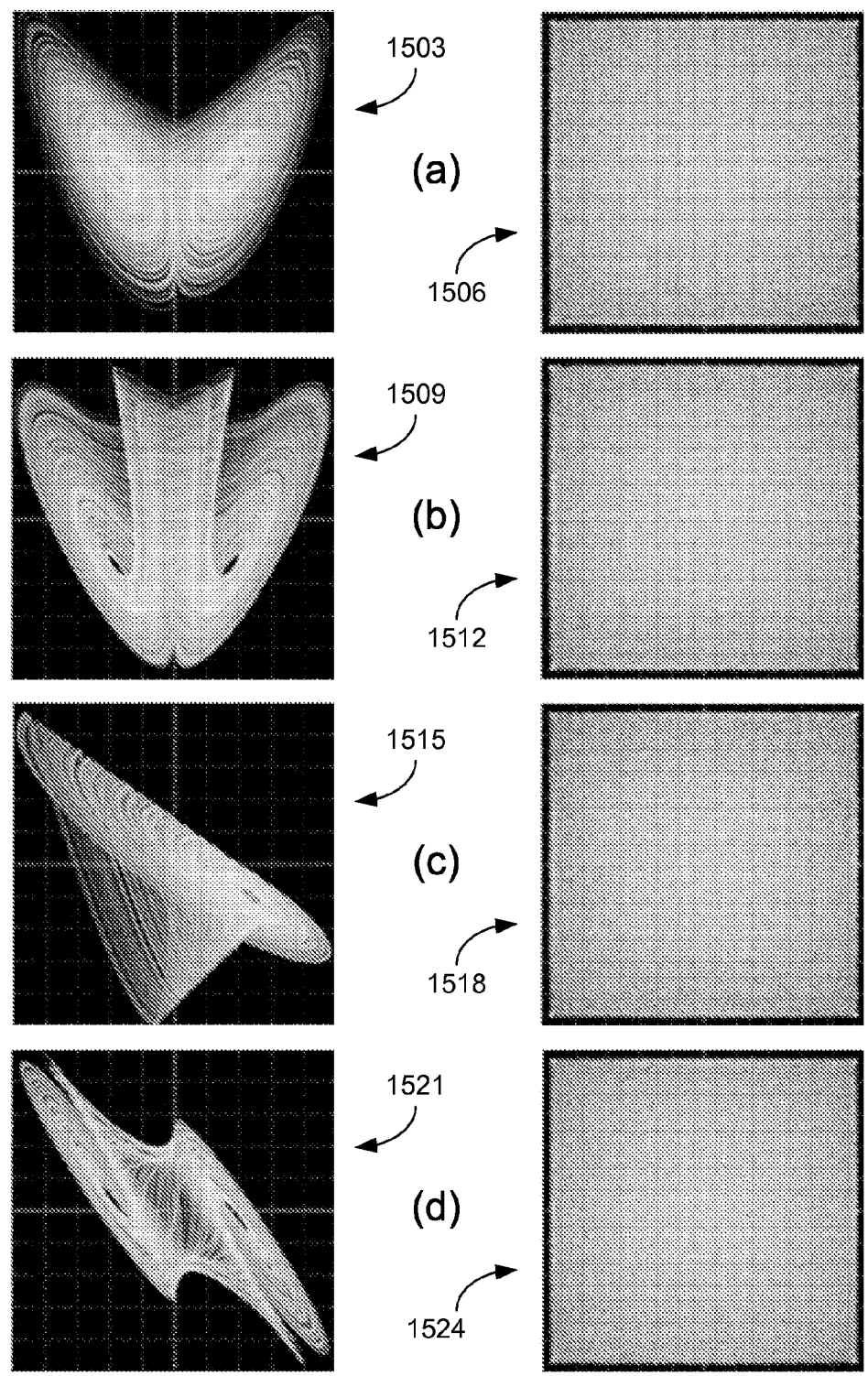
FIG. 15 illustrates examples of the X-Y and U-W attractors for FIG. 15(a) a Lorenz system, FIG. 15(b) a Chen system, FIG. 15(c) an Elwakil system, and FIG. 15(d) a Sprott system of FIG. 14 in accordance with various embodiments of the present disclosure.

The experimental performance results on a Xilinx Virtex 4 FPGA are also provided in the table of FIG. 14 for the four systems 1403-1412 (without and with the post processing) to illustrate the hardware impact of post processing. FIG. 15 depicts (a) the X-Y attractor 1503 and U-W attractor 1506 for the Lorenz system 1403, (b) the X-Y attractor 1509 and U-W attractor 1512 for the Chen system 1406, (c) the X-Y attractor 1515 and U-W attractor 1518 for the Elwakil system 1409, and (d) the X-Y attractor 1521 and U-W attractor 1524 for the Sprott system 1412. Referring back to the table of FIG. 14, all systems show logic utilizations less than 0.84%, flip-flop utilization less than 0.53% and throughput up to 15.44 Gbits/s for 32-bit implementations with the same clock frequency. As such, post processing is not the combinational bottleneck. To assess scalability, a figure of merit (FOM) is devised as:

$$FOM = \frac{\text{Throughput}}{\text{Area}} = \frac{f_{CLK} \times N_{RNG}}{8 \times (LUT + FF)}. \qquad \text{EQN. 8}$$

The numerator expresses the throughput where $f_{CLK}$ is the clock frequency in MHz and $N_{RNG}$ specifies the number of output bits per cycle utilized as RNG. The denominator approximates a gate count with LUT and FF specifying the number of look-up tables and flip-flops used on the FPGA. The FOM results are shown for a range of bus widths in FIG. 16.

Figure 16:
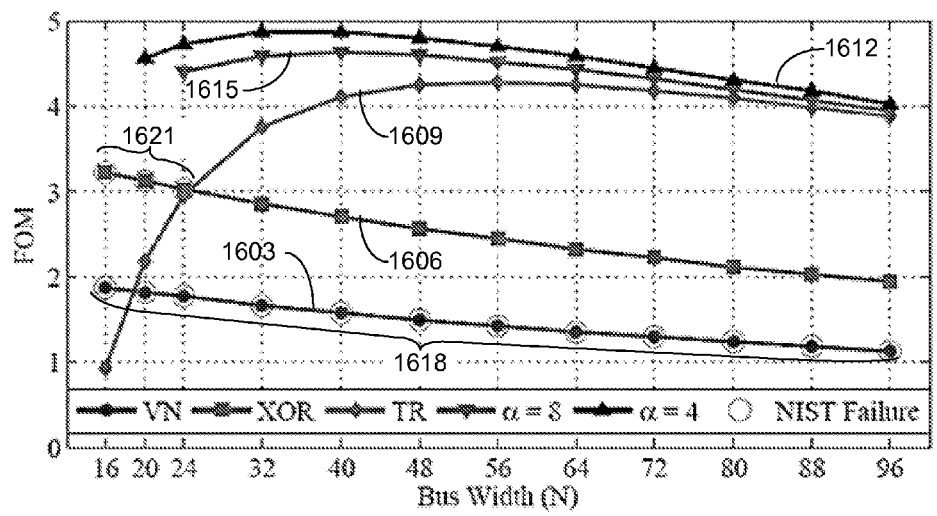
FIGS. 16 and 17 are plots of the figure of merit (FOM) against bus width for various examples of processing techniques in accordance with various embodiments of the present disclosure.

FIG. 16 illustrates a plot of the FOM results for Von Neumann (VN) 1603, 2-bit simple XOR (XOR) correction 1606, truncation of defective bits (TR) 1609, and the disclosed post processing with $\alpha=4$ (1612) and $\alpha=8$ (1615) against bus width. NIST failures 1618 and 1621 are highlighted ("O") on curves 1603 and 1606, respectively. The disclosed post processing technique was most effective if the number of overlap bits $\alpha$ is kept to the minimum possible value (e.g., $\alpha=\epsilon=4$ in this case). In particular, an optimal FOM of 4.86 was observed at a 32-bit implementation for $\alpha=4$. For very high bus widths, the FOM of the disclosed post processing 1612 and 1615 becomes roughly similar to, but still greater than the FOM of truncation 1609, but a post processed system would remain superior as it would provide more throughput (output bits) in absolute terms. Von Neumann 1603 is insufficient to suppress all the bias in the system, as indicated by the NIST failures 1618 for all bus widths. The 2-bit simple XOR correction 1606 requires, at a minimum, that the number of statistically random bits be at least equal to the number of defective bits. Since $\beta=14$ is known, the 2-bit simple XOR correction 1606 only works for bus widths greater than 28, as indicated by the NIST failures 1621 at bus widths of 16, 20, and 24 bits.

Figure 17:
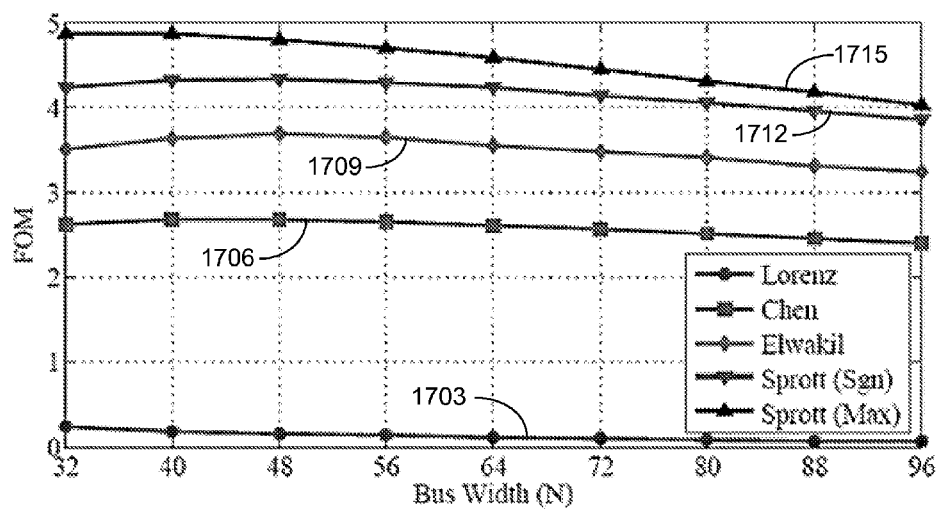

Referring next to FIG. 17, shown is a plot of the FOM results for the disclosed post processing when applied to the digital implementations of the different chaotic oscillators for bus widths from 32 to 96 bits. FIG. 17 depicts the FOM 1703 of Lorenz 1403 (FIG. 14), the FOM 1706 of Chen 1406 (FIG. 14), the FOM 1709 of Elwakil 1409 (FIG. 14), the FOM 1712 of Sprott (Sgn) 1412 (FIG. 14), and FOM 1715 of Sprott (Max) 100 (FIG. 1) with $\alpha=\epsilon$ for hardware optimality. The Sprott (Max) system 100 with maximum function nonlinearity of EQN. 1c shows the best FOM performance 1715 while the Lorenz system 1403 shows the worst FOM 1703, primarily due to the huge area requirement for the two 32×32 bit multipliers. Furthermore, as the size of the system increases, the relative overhead of introducing the post processing diminishes.

Figure 18:
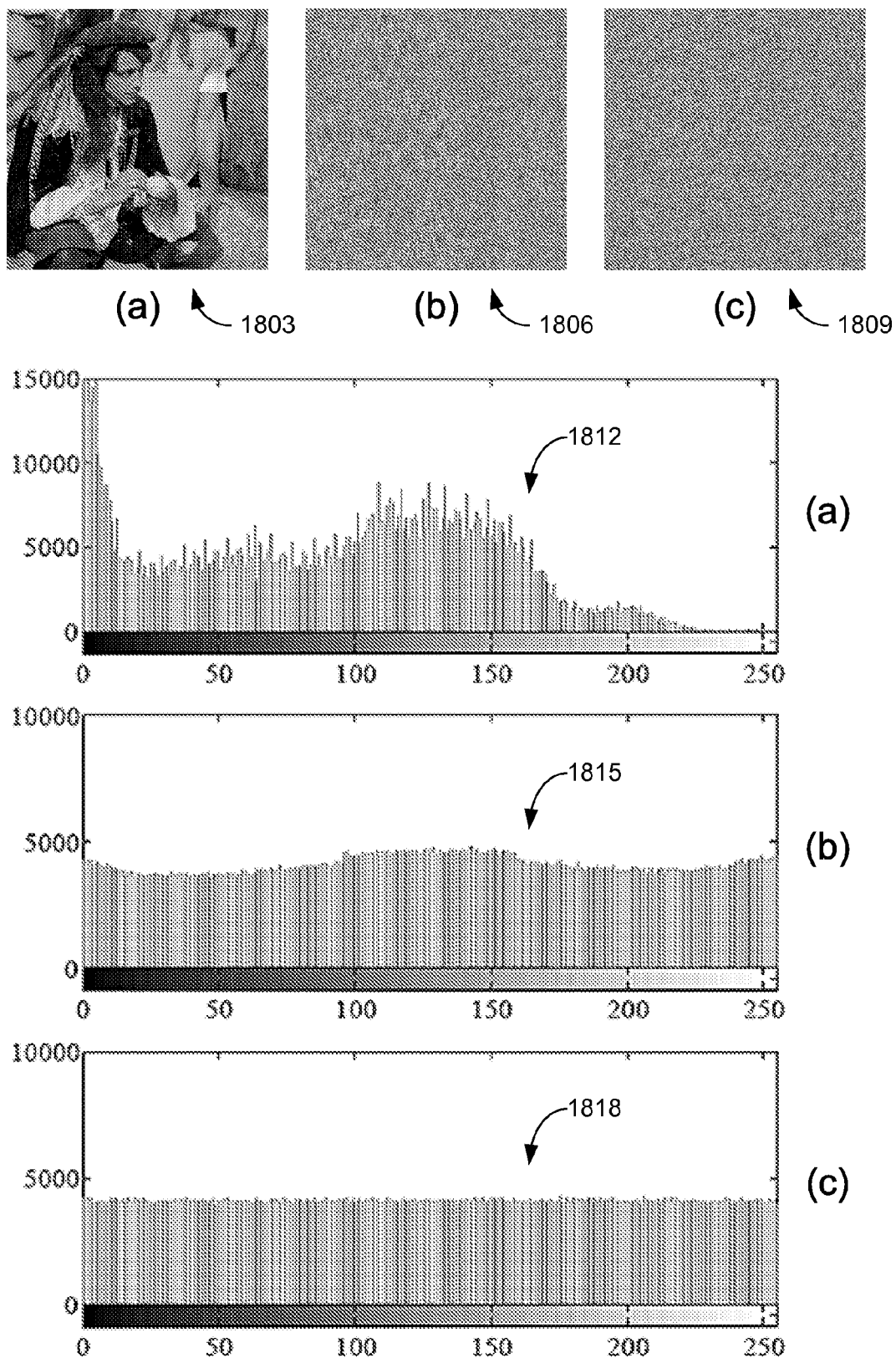
FIG. 18 illustrates examples of FIG. 18(a) a plain image, FIG. 18(b) the plain image encrypted with an original chaotic output, and FIG. 18(c) the plain image encrypted with a post processed output and corresponding histograms in accordance with various embodiments of the present disclosure.

To demonstrate the effect of the quality of randomness in cryptographic applications, the generated key streams of both the original chaotic outputs {X,Y,Z} and the post processed outputs {U,V,W} were examined through a simple image encryption/decryption system. In general, images are prone to statistical cryptanalysis attacks due to the high correlation between adjacent pixels and the non-uniform histogram. A simple encoder directly XORs input image pixels with the key stream bits generated by the chaotic oscillator. When received by the decoder, the ciphered data is XORed again with the same key stream (e.g., produced from a similar chaotic oscillator) to reproduce the original image. Referring to FIG. 18, shown are an image and corresponding histogram of (a) a plain image 1803, (b) the plain image encrypted with original chaotic output 1086, and (c) the plain image encrypted with post processed output 1809. The plain image 1803 was 1024×1024 pixel grayscale image, which produced the corresponding histogram 1812 shown in FIG. 18. When the image 1803 was XORed with the original chaotic outputs {X,Y,Z}, the resulting encrypted image 1806 was not effectively masked and suffers from statistical information leakage as illustrated by the non-uniform histogram 1815 in FIG. 18. When the plain image 1803 was XORed with the post processed outputs {U,V,W}, the pixels of the resulting encrypted image 1809 appeared as noise with a uniform histogram 1818 as shown in FIG. 18.

Referring now to FIG. 19, shown is a table that compares the maximum function CB-PRNG (with the disclosed post processing) and the ODE-based CB-PRNGs from the table of FIG. 14 in terms of hardware efficiency, all with 32-bit implementations, to other PRNGs in the literature and a linear feedback shift register (LFSR) for reference. In all cases of post processing, $\alpha=\epsilon$ is used. In an FPGA implementation, the gate count is expressed as 8×(LUT+FF) to facilitate a basic area comparison, as with the FOM in EQN. 8. The disclosed post processing technique yields a higher FOM for each tested system when compared to several previous CB-PRNGs due to the increase in the throughput. In general, the logistic map occupies a disproportionately large area for a one dimensional (1-D) system due to the multiplier, as was also reflected in the Lorenz system that requires two multipliers. Implementation of discontinuous nonlinearities (signum, maximum, modulus) is easier in digital hardware and accounts for the significantly lower area of other systems shown. Higher throughputs arise from the disclosed post processing and three dimensional (3-D) system outputs {U,V,W}.

A generalized post processing technique has been presented to eliminate bias in CB-PRNGs using a nonlinear XOR-based operation with rotation and feedback, maximizing throughput with a minimal area penalty. The disclosed post processing technique may be applied wherever there is a non-uniform distribution of randomness in a set of bitstreams. A third order chaotic system with maximum function nonlinearity was implemented with a positive MLE of 0.1362. The resulting CB-PRNG passes all NIST SP. 800-22 tests for all output bits, with throughput surpassing other processing techniques and previous CB-PRNGs. The disclosed post processing technique was shown to work effectively for other known chaotic systems for efficient random number generation, which verified its generalize effect, and was shown to enhance performance (e.g., security performance) of a basic image encryption system. Results were experimentally verified on a Xilinx Virtex 4 FPGA with throughput up to 15.44 Gbits/s for a 32-bit implementation.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
   a pseudo-random number generator (PRNG) configured to generate a series of digital outputs including a current digital output, each digital output of the series of digital outputs comprising a first portion including a predetermined number of bits with highest significance and a second portion including bits with lower significance; and
   a nonlinear post processing circuit configured to generate a series of post processed outputs including a current post processed output and a previous post processed output, each post processed output of the series of post processed outputs comprising a corresponding first portion including the predefined number of bits with highest significance, where an exclusive OR (XOR) operation is performed on the first portion of the current digital output and a permutated version of the corresponding first portion of the previous post processed output to generate the corresponding first portion of the current post processed output.

2. The system of claim 1, wherein the nonlinear post processing circuit is further configured to rotate the corresponding first portion of the previous post processed output by a predetermined number of rotation bits to generate the permutated version of the corresponding first portion of the previous post processed output.

3. The system of claim 2, wherein the first portion of each digital output comprises a first subset of non-random bits and a second subset of random bits.

4. The system of claim 3, wherein the predetermined number of rotation bits is based upon the first subset of non-random bits.

5. The system of claim 2, wherein the nonlinear post processing circuit is further configured to delay the corresponding first portion of the current post processed output by one clock cycle to generate the corresponding first portion a next previous post processed output.

6. The system of claim 1, wherein the nonlinear post processing circuit is further configured to provide the second portion of the current digital output of the PRNG as a second portion of the current post processed output.

7. The system of claim 6, wherein the second portion of the current digital output comprises only random bits.

8. The system of claim 6, wherein each digital output comprises N bits and each post processed output comprises N bits.

9. The system of claim 3, wherein the first portion comprises $\gamma=\alpha+\beta$ bits, with the first subset comprising $\beta$ statistically non-random bits, and the second subset comprising $\alpha$ statistically random bits.

10. The system of claim 9, wherein the predetermined number of rotation bits is $\beta$.

11. The system of claim 9, wherein the $\gamma$ bits of the first portion are classified as statistically non-random or statistically random based upon NIST Special Publication (SP) 800-22 (2010) testing.

12. A method, comprising:
    receiving at least a first portion of a current PRNG output from a digital pseudo-random number generator (PRNG), the first portion including a predetermined number of bits with highest significance of the current PRNG output; and
    performing an exclusive OR (XOR) operation on the first portion of the current PRNG output with a permutated version of a corresponding first portion of a previous post processed output to generate a corresponding first portion of a current post processed output.

13. The method of claim 12, further comprising:
    receiving a second portion of the current PRNG output, the second portion including bits with lower significance than the predetermined number of bits with highest significance of the current PRNG output; and
    providing the corresponding first portion of the current post processed output and the second portion of the current PRNG output as the current post processed output.

14. The method of claim 13, wherein the current PRNG output and the current post processed output have the same number of bits.

15. The method of claim 12, further comprising rotating the corresponding first portion of the previous post processed output by a predetermined number of bits to generate the permutated version.

16. The method of claim 15, wherein the previous post processed output is delayed by at least one clock cycle before rotation.

17. The method of claim 15, wherein the first portion of the current PRNG output comprises a first subset of non-random bits and a second subset of random bits.

18. The method of claim 17, wherein the first portion comprises $\gamma=\alpha+\beta$ bits, with the first subset comprising $\beta$ statistically non-random bits, and the second subset comprising $\alpha$ statistically random bits.

19. The method of claim 18, wherein the corresponding first portion of the previous post processed output is rotated by $\beta$ bits.

20. The method of claim 17, wherein the predetermined number of rotation bits is based upon the first subset of non-random bits.

* * * * *